July 8, 1969  C. M. JONES  3,454,856
OSCILLATOR FOR A BATTERY OPERATED CLOCK
Filed Jan. 21, 1966

Inventor:
Clifford M. Jones.
by Leonard J Platt
His Attorney

__United States Patent Office__

3,454,856
Patented July 8, 1969

3,454,856
OSCILLATOR FOR A BATTERY OPERATED CLOCK
Clifford M. Jones, Waynesboro, Va., assignor to General Electric Company, a corporation of New York
Filed Jan. 21, 1966, Ser. No. 522,290
Int. Cl. H02k 29/00; H02p 3/02, 5/06
U.S. Cl. 318—138                                8 Claims

ABSTRACT OF THE DISCLOSURE

An electromechanical oscillator for driving a synchronous motor for a battery operated clock wherein a separate amplifier transistor is used to drive the synchronous motor to prevent any energy losses in the motor from being reflected back into the electrical and mechanical oscillator.

---

This invention relates to timekeeping mechanisms and more particularly to an improved solid state electromechanical oscillator for synchronizing the rotation rate of a timekeeping mechanism.

A relatively accurate timekeeping mechanism has been developed which comprises a battery operated clock employing a synchronous motor, the rate of rotation of which is determined by an electromechanical oscillator. The electric portion of the oscillator is connected to the motor and to the battery and includes a pickup coil which is positioned in inductive relationship with a permanent magnet mounted on the mechanical portion of the oscillator. The mechanical portion has a relatively accurate natural frequency of oscillation which is chosen to be close to the frequency of oscillation of the electric portion of the oscillator. When the mechanical portion is actuated, its permanent magnet induces signals in the pickup coil of the electric portion to cause it to oscillate with the frequency of the mechanical portion. The electric portion produces electric signals which are used to maintain oscillations in the mechanical portion and also to drive the synchronous motor. Since the electric portion drives the synchronous motor, the rate of rotation of the clock is synchronized with, and is as accurate as, the mechanical frequency of oscillation of the mechanical portion of the oscillator.

Prior art systems of the type described, while being relatively accurate, have suffered disadvantages in that they are not as stable with temperature and supply voltage variations as would be desirable. Temperature and supply voltage variations tend to effect the amplitude of oscillation of the mechanical portion of the oscillator which, in turn, effects its natural frequency of oscillation. It would be desirable to alleviate this effect. Additionally, in prior art systems the energy required to tune the motor and energy losses occurring in the motor are reflected into the electric portion of the oscillator which tend to lower the "Q" and therefore the efficiency of the system as a timekeeping mechanism. It would also be desirable to alleviate this effect.

It is therefore an object of this invention to provide an improved electromechanical oscillator for a timekeeping mechanism which is relatively stable with changes in voltsages and temperatures.

It is another object of this invention to provide an improved electromechanical oscillator for a battery operated clock in which the driving energy for and energy losses in the clock's motor do not tend to decrease the efficiency of the clock.

These and further objects of this invention are achieved in one form in a circuit which employs a pair of transistors and a pair of coils, one transistor and one coil being used to pick up signals from the mechanical portion of the oscillator and transform them into proportional electronic oscillations. The second transistor is utilized to amplify the electronic oscillations produced by the first transistor and to drive the synchronous motor of the clock, and the second coil is utilized to feed back the electronic oscillations from the first transistor to the mechanical portion of the oscillator to maintain it in oscillation. Since one transistor is used to drive the mechanical portion and another transistor is used to drive the motor, energy losses in the motor are not reflected back into the mechanical portion.

The subject matter which is regarded as my invention is particularly pointed out and distinctly claimed in the appended claims. My invention, however, both as to its organization and method of operation, together with further objects and advantages thereof, may best be understood by reference to the following description taken in conjunction with the accompanying drawings in which:

Figure 1:
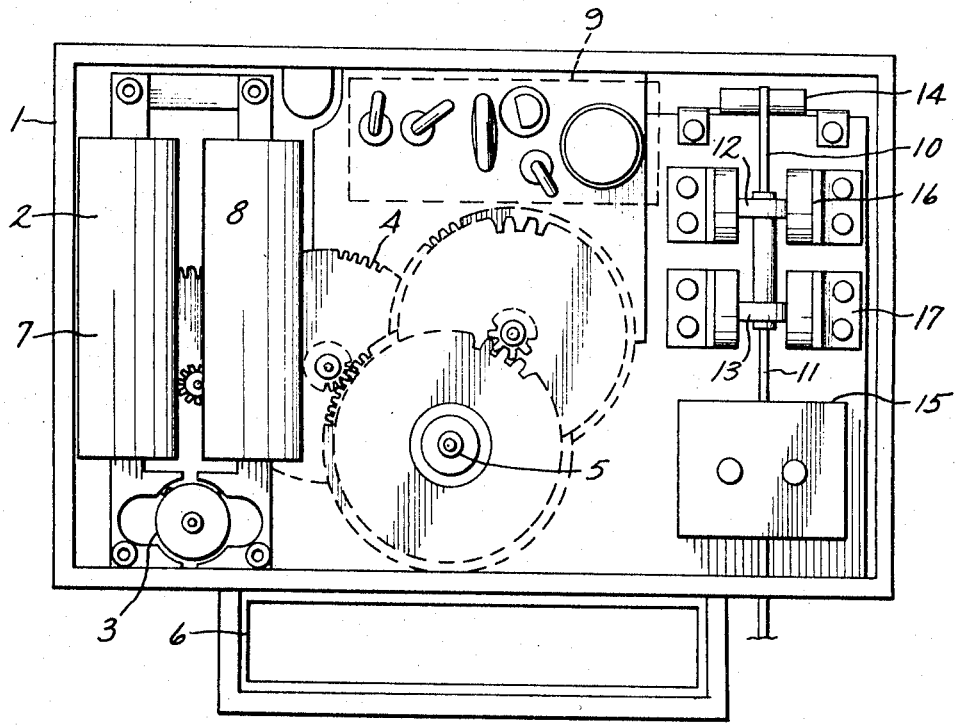
FIG. 1 is an elevation view section showing the general components of a battery operated clock.

Referring to FIG. 1 battery operated clock casing 1 is shown to include a pulse or AC permanent magnet motor 2 having a rotor 3 which is coupled in driving engagement with a gear train 4 for driving a pair of clock hands (not shown) by means of a concentric shaft mechanism 5. The motor 2 is powered by means of a battery 6 and is excited and synchronized by electrical oscillations in its stator windings 7 and 8 which oscillations are supplied by means of an electrical oscillator circuit 9. A mechanical oscillator member 10 comprises a torsion member 11 to which a pair of permanent magnets 12 and 13 are fixedly secured. The ends of the torsion member 11 are secured to a pair of support members 14 and 15. The torsion member 11 may comprise a flat wire which oscillates at a natural frequency depending upon its length between the support members 14 and 15 and upon the tension supplied thereto by tension adjusting means not shown. Oscillation of the torsion wire 11 causes the permanent magnets 12 and 13 to also oscillate thereby setting up an oscillatory magnetic field. A pair of coils 16 and 17 are inductively coupled to the permanent magnets 12 and 13 respectively, the coils being electrically connected in the electronic oscillator circuit 9.

Figure 2:
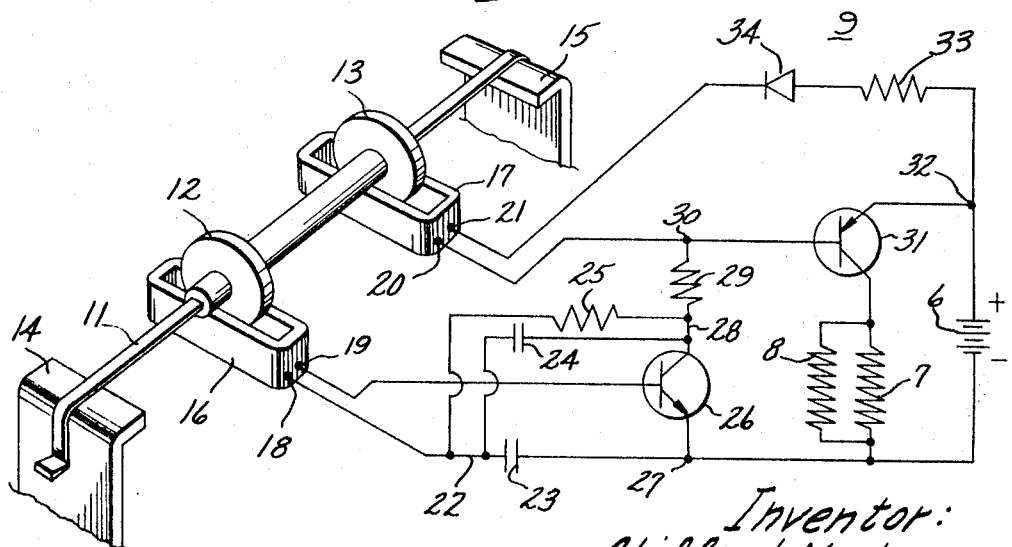
FIG. 2 is a perspective of a mechanical oscillator and a circuit diagram of an electronic oscillator, both of which comprise the electromechanical oscillator utilized in the battery operated clock of FIG. 1.

The mechanical oscillator 10 comprising the torsion member 11 and the permanent magnets 12 and 13 is more clearly shown in perspective in FIG. 2 wherein like numerals are utilized to designate like parts in FIG. 1. In FIG. 2 the electric coils 16 and 17 are shown in very close proximity to the permanent magnets 12 and 13 so that a very close inductive coupling is obtained. Electrical connections to the electronic oscillator circuit 9 from the electric coil 16 are made via a pair of terminal connections 18 and 19 and other electrical connections from the electric coil 17 to the oscillator circuit 9 are made via a pair of terminals 20 and 21. The terminal point 18 is connected to a junction point 22, to which is also connected one side of a capacitor 23, one side of a second capacitor 24, and one side of a resistor 25. The terminal point 19 is directly connected to the base electrode of an oscillator transistor 26, the emitter electrode of which is connected to a junction point 27 and the collector electrode of which is connected to a junction point 28. The sides of the resistor 25 and the capacitor 24 opposite that connected to the junction point 22 are connected to the junction point 28 as is one side of a second resistor 29. The side of the capacitor 23 opposite that connected to the junction point 22 is directly connected to the junction point 27. The terminal 20 of the coil 17 is connected to a junction point 30 which is also connected to the side of the resistor 29 opposite the junction 28. The junction point 30 is also directly connected to the base electrode of an amplifier transistor 31, the emitter electrode of which is connected to a junction point 32. The collector electrode of the transistor 31 is connected to the stator windings 7 and 8 of the motor 2, the opposite sides of which are connected to the junction point 27. The battery 6 is connected across the junctions 32 and 27 with its positive terminal being connected to the junction point 32. To complete the circuit for the electronic oscillator 9 a resistor 33 is connected in series with a diode 34 between the junction 32 and the terminal 21 of the coil 17. The diode 34 is poled in a direction for current flow from the junction point 32 to the terminal point 21.

When the system is first energized by application of the battery 6 to the circuit, a current flows through the drive coil 17 thereby inducing movement in the permanent magnet 13. This movement sets up oscillations in the torsion wire 11, which oscillations are maintained at a natural frequency determined by the physical characteristics of the wire 11. Oscillations of the torsion wire 11 cause electrical signals to appear in both the pickup coil 16 and the drive coil 17. During the first half-cycle of oscillation of the wire 11, a positive signal is induced in the pickup coil 16 at terminal 19. During the next half-cycle, when the permanent magnet 12 is moving in the opposite direction, the terminal 19 becomes negative with respect to terminal 18. The oscillator transistor 26 is self-biased by the resistor 25. During the first half-cycle of oscillation of the wire 11, the transistor 26 is carried further into saturation and during the next half-cycle the transistor 26 is carried further out of saturation. The capacitor 24 connected across the resistor 25 provides a low impedance path for high frequency oscillations that may occur due to coupling between the coils 16 and 17 and thereby prevents the oscillator transistor 26 from breaking into high frequency oscillations. The capacitor 23 provides a low impedance current path for the signals induced in the pickup coil 16 between the base and emitter electrodes of the transistor 26 while at the same time blocking DC power from the battery 6 away from the mechanical portion of the oscillator 10.

The resistor 29 comprises a portion of the collector electrode load resistor for the oscillator transistor 26. During the first half-cycle of oscillation in the torsion wire 11, when the transistor 26 is carried toward its saturation region, the collector electrode voltage decreases thereby lowering the voltage present at the terminal 30. During the next half-cycle the opposite effect occurs and the transistor 26 is carried out of saturation thereby raising its collector electrode voltage and in turn the voltage present at the terminal 30. Since the terminal 30 is connected back to the drive coil 17 at its terminal 20, the circuit is regenerative and the mechanical oscillator 10 and the oscillator transistor 26 comprise an electromechanical oscillator.

The base electrode of the amplifier transistor 31 is connected to the junction point 30 and is biased on since the voltage at the junction point 30 will be lower than the voltage at the junction point 32. The emitter-base biasing current through the amplifier transistor 31 effectively subtracts from the driving current supplied to the drive coil 17 by the oscillator transistor 26. During the first half-cycle of oscillations when the voltage at the junction point 30 is decreased, conduction in the transistor 31 is heavier than during the second half-cycle when the voltage at the junction point 30 rises. Thus, amplified current pulses at an oscillation frequency equal to the mechanical oscillating frequency of the wire 11 appear at the collector output electrode of the amplifier transistor 31. These amplified current pulses are applied to the stator windings 7 and 8 of the synchronous motor 2 causing it to run at a synchronized rate to drive the clock hands. Since the amplifier transistor 31 and the stator windings 7 and 8 of the motor 2 form no part of the electromechanical oscillator, energy losses in the motor are not reflected into the electromechanical oscillator. Thus, the "Q" of the electromechanical oscillator portion of the circuit can be maintained relatively high thereby maintaining the efficiency of the system as a timekeeping mechanism likewise relatively high.

The feedback resistor 33 in conjunction with the load resistor 29 comprises an amplitude control circuit for the current pulses in the drive winding 17. Any tendency of the amplitude of oscillation in the torsion wire 11 to increase, caused by an increase in supply voltage, causes the transistor 26 to become more conductive thereby tending to decrease further the voltage at the junction point 30 during the first half-cycle. This lowered voltage causes the emitter to base junction of transistor 31 to conduct more heavily thereby subtracting most of the increased available drive current through the drive coil 17. This subtraction of drive current through the drive coil 17 tends to maintain the drive coil current relatively constant and thus the amplitude of oscillations in the torsion wire 11 relatively constant. Since the resistors 33 and 29 are connected in the paths of current which flow through the drive coil 17, and adjustment in their magnitude effects a control over the amplitude of oscillation of the torsion wire 11.

Current amplitude variations in the drive coil 17 may also occur with changes in the base-emitter voltage drop of the transistor 31 due to temperature variations. Temperature compensation is accomplished by the diode 34 which is connected in the current path for the drive coil 17. As the temperature increases, the voltage drop across the base-emitter junction of the transistor 31 decreases thereby increasing the amount of current subtracted from the available drive current for the coil 17 at the junction point 30. This tends to cause a decrease in the amplitude of oscillation of the torsion wire 11. This tendency to decrease is compensated for by the diode 34 due to the fact that the same increase in temperature lowers the forward voltage drop of the diode 34 thereby increasing the drive coil current flowing therethrough. The diode 34 should therefore be made out of the same semiconductor material as the transistor 31 or at least some means should be devised so that similar temperature variations in the transistor 31 and the diode 34 occur.

Applicant has discovered that by the utilization of a second transistor 31 and the voltage and temperature compensating resistor and diode 33 and 34, a timekeeping circuit of much greater efficiency than the circuits of the prior art is obtained. In a preferred embodiment a test on a timekeeping circuit incorporating the teachings of applicant's invention showed a frequency variation of less than ±.005% over a temperature range of 77 to 105° F. and a voltage supply range of 1 to 1.6 volts.

While applicant has described his invention in one form, it should be understood that his invention is not limited to the specific embodiment described. For example, a torsion wire mechanism has been developed which utilizes a single permanent magnet rather than the pair of permanent magnets 12 and 13 shown in FIG. 2. In this embodiment the pickup winding 16 and the drive winding 17 may be wound on the same core but in opposite directions so that they can both be placed in inductive relationship with the single permanent magnet while performing the same functions as described with respect to FIG. 2. It should be understood that it does not matter whether there exists any inductive coupling between the coils 16 and 17 due to the fact that any high frequency oscillations that this mutual induction may cause are shunted away from the oscillation transistor 26 by the capacitor 24. Therefore, the winding of the coils 16 and 17 on the same core has no effect on the operation of the circuit. Thus it is intended that applicant be entitled to the full scope of the appended claims.

What I claim as new and desire to secure by Letters Patent of the United States is:

1. An electromechanical oscillator circuit for timing driving pulses to a synchronous motor comprising:
   (a) a voltage source;
   (b) a mechanical oscillator, including an input for causing oscillation and an output indicative of the oscillation;
   (c) an electrical oscillator including an input terminal and an output terminal, said electrical oscillator being connected to said voltage source and being biased so as to produce an oscillating current signal at said output terminal during both half-cycles of an input signal at said input terminal;
   (d) means directly coupling said output of said mechanical oscillator to said input terminals of said electrical oscillator and means for directly coupling the output terminal of said electrical oscillator to said input of said mechanical oscillator whereby the oscillations at said output terminal of said electrical oscillator are maintained by said mechanical oscillator; and
   (e) an amplifier including a high impedance input circuit and an output circuit, said high impedance input circuit being connected to said output terminal of said electrical oscillator and said output circuit being connected to the synchronous motor and to said voltage source, whereby said electrical and mechanical oscillators are isolated from losses in said motor.

2. The electromechanical oscillator circuit as claimed in claim 1 wherein said electrical oscillator comprises a transistor oscillator circuit and said amplifier comprises a transistor amplifier circuit.

3. The electromechanical oscillator circuit as described in claim 2 wherein said mechanical oscillator comprises a torsion wire oscillator.

4. The electromechanical oscillator circuit as described in claim 3 wherein said means for electromagnetically coupling said mechanical oscillator to said electrical oscillator comprises a permanent magnet means fixedly secured to said torsion wire oscillator and further comprises first and second electric coils inductively coupled to said permanent magnet means and electrically connected to said input terminal and said output terminal of said electrical oscillator respectively.

5. The electromechanical oscillator circuit as described in claim 4 and further including a feedback path between said output circuit of said transistor amplifier and said second coil, said feedback path including a voltage stabilizing resistor.

6. The electromechanical oscillator circuit as defined in claim 4 and further including a feedback path between said output circuit of said transistor amplifier and said second coil, said feedback path including a temperature compensating diode.

7. The electromechanical oscillator circuit as defined in claim 4 and further including a feedback path between said output circuit of said transistor amplifier and said second coil, said feedback path including a voltage stabilizing resistor and further including a temperature compensating diode.

8. An electromechanical oscillator circuit for timing driving pulses to a synchronous motor for a battery powered clock comprising:
   (a) a battery voltage source,
   (b) a torsion wire oscillator including a permanent magnet means fixedly secured to said torsion wire, said torsion wire oscillator adapted to oscillate at a predetermined frequency to cause the permanent magnet to set up an oscillating magnetic field,
   (c) a transistor oscillator connected to said battery and including an input circuit and an output circuit, said output circuit including a load resistor, said transistor oscillator being normally biased toward its saturation point, and adapted to set up a current signal in said load resistor at a frequency proportional to the predetermined frequency of said torsion wire,
   (d) a first electric pickup coil inductively coupled to said permanent magnet means and electrically connected to said input circuit of said transistor oscillator, the oscillating magnetic field of said permanent magnet inducing electric signals at the predetermined frequency in said pickup coil, the electric signal driving said transistor oscillator further into its saturation region during a first half-cycle of oscillation of said torsion wire and driving said transistor oscillator out of its saturation region during a second half-cycle of oscillation of said torsion wire,
   (e) a second electric driving coil inductively coupled to said permanent magnet means in the opposite sense as said first electric pickup coil and electrically connected to said battery and to said load resistor to draw a first portion of the current signal in said load resistor to impart motion to said permanent magnet means thereby maintaining oscillations in said torsion wire,
   (f) a transistor amplifier including an input circuit and an output circuit, said input circuit being connected to said battery and to said load resistor and said output circuit being connected to said voltage source and to the synchronous motor, said transistor amplifier amplifying a second portion of the current signal in said load resistor to drive the synchronous motor at a rate proportional to the predetermined frequency of oscillation of said torsion wire,
   (g) a feedback path connected between said output circuit of said transistor amplifier and said second electric driving coil and including a voltage stabilizing resistor and a temperature compensating diode.

References Cited
UNITED STATES PATENTS

| | | | |
|---|---|---|---|
| 2,829,324 | 4/1958 | Sargeant | 318—128 |
| 2,905,904 | 9/1959 | Sargeant | 318—132 |
| 2,961,587 | 11/1960 | Aeschmann | 378—132 |
| 2,994,023 | 7/1961 | Devol | 318—138 |
| 3,015,054 | 12/1961 | Thoma | 318—132 XR |
| 3,134,220 | 5/1964 | Meisner | 318—138 XR |
| 3,214,662 | 10/1965 | De Wolf | 318—138 XR |
| 3,250,066 | 5/1966 | Englehardt et al. | 318—138 XR |

ORIS L. RADER, *Primary Examiner.*

G. Z. RUBENSTEIN, *Assistant Examiner.*

U.S. Cl. X.R.

318—132